United States Patent [19]

Imaide et al.

[11] 4,355,335

[45] Oct. 19, 1982

[54] SIGNAL PROCESSING CIRCUIT FOR USE IN SOLID-STATE CAMERA

[75] Inventors: Takuya Imaide, Yokohama; Hiroaki Nabeyama, Kamakura; Masaru Noda, Fujisawa; Michio Masuda, Yokohama; Morishi Izumita, Inashiro; Shinya Ohba, Kokubunji, all of Japan

[73] Assignee: Hitachi, Ltd., Tokyo, Japan

[21] Appl. No.: 192,997

[22] Filed: Oct. 2, 1980

[30] Foreign Application Priority Data

Oct. 3, 1979 [JP] Japan .................................. 54-126852

[51] Int. Cl.³ .............................................. H04N 3/14
[52] U.S. Cl. .................................... 358/213; 358/167
[58] Field of Search ........................ 358/213, 167, 184

[56] References Cited

U.S. PATENT DOCUMENTS 4,153,915 5/1979 McKechnie ........................ 358/213

Primary Examiner—Richard Murray
Attorney, Agent, or Firm—Antonelli, Terry & Wands

[57] ABSTRACT

A signal processing circuit for use in a solid-state camera comprising a sensor for deriving an electrical signal from the camera, a preamplifier for amplifying the output of the sensor and an integrator for integrating the output of the preamplifier. A specific circuit arrangement is provided for the preamplifier to narrow the bandwidth of the preamplifier, so that an abnormal increase of noise in the electrical signal is effectively suppressed.

15 Claims, 20 Drawing Figures

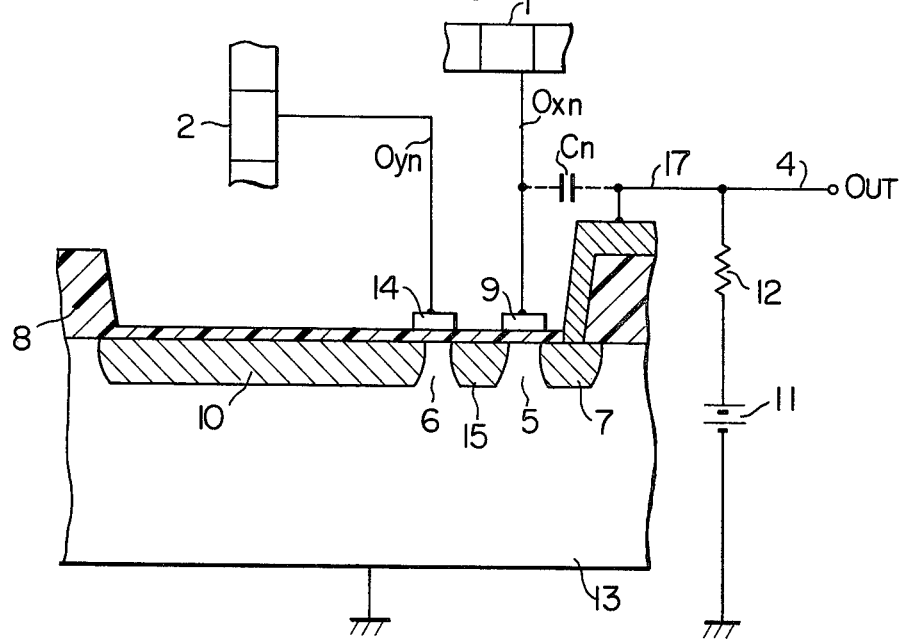
FIG. IC
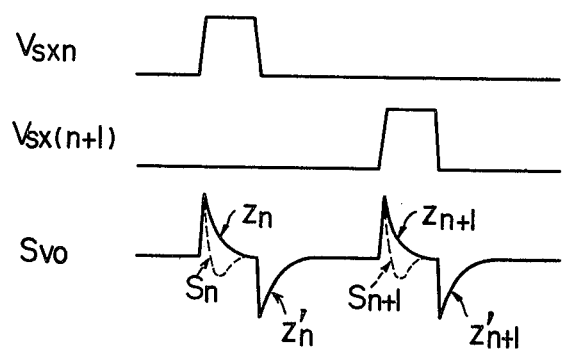
FIG. 2
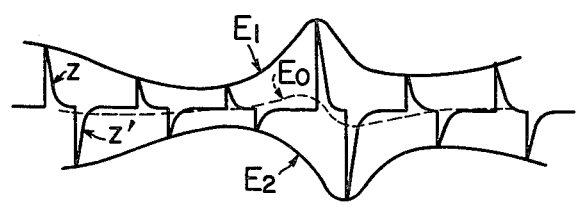
FIG. 3

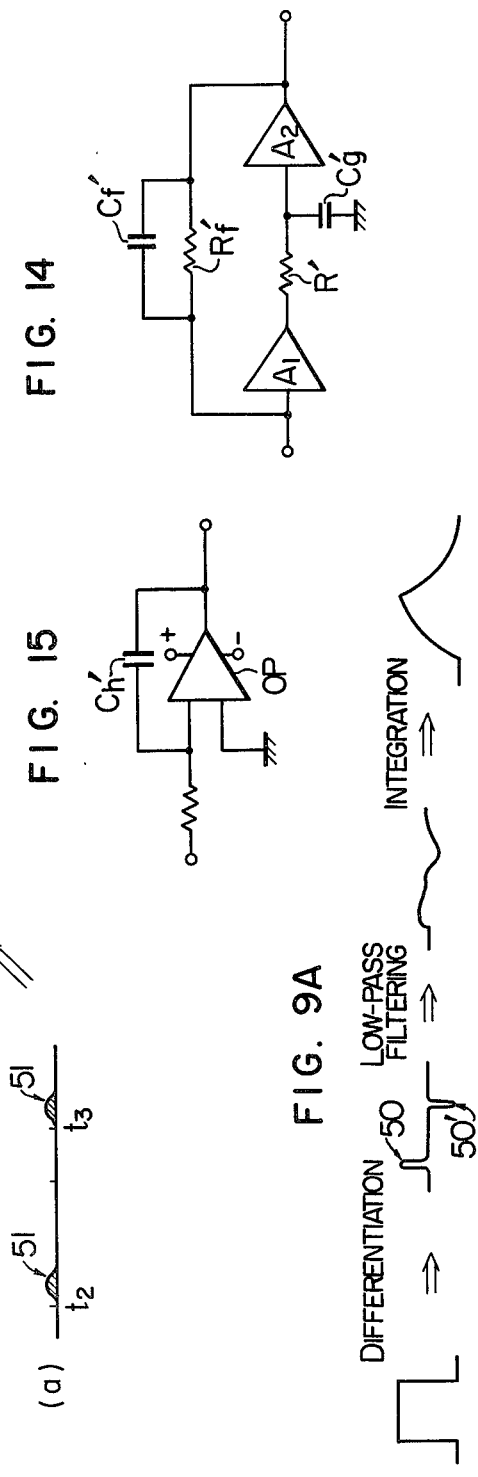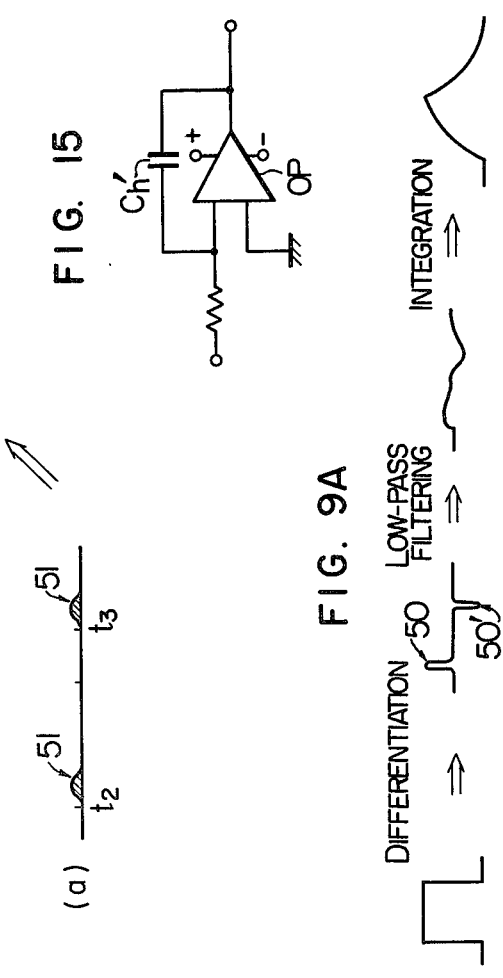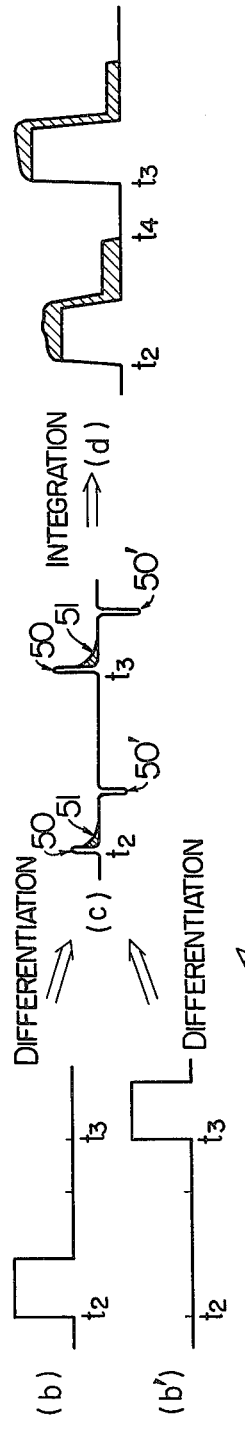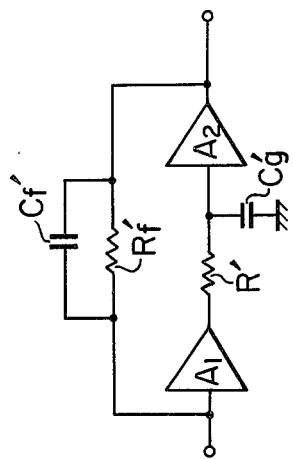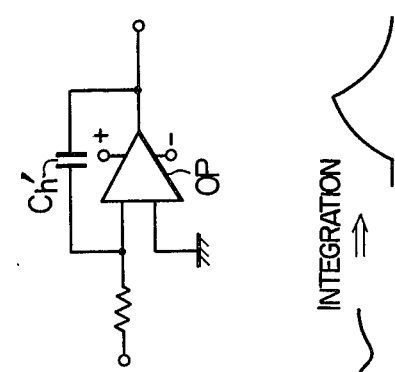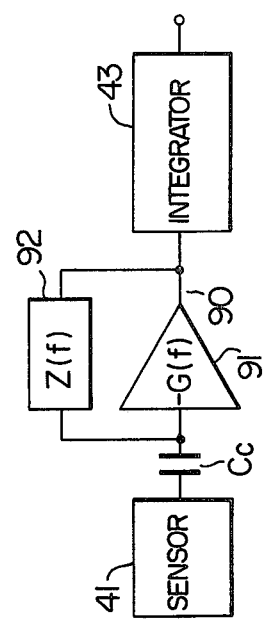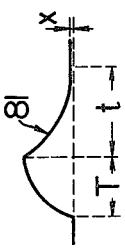

SIGNAL PROCESSING CIRCUIT FOR USE IN SOLID-STATE CAMERA

This invention relates to a signal processing circuit for use in a solid-state camera such as for example having a plurality of photodiodes which are arranged in a semiconductor substrate surface linearly or two-dimensionally and which provide a stored charge distribution corresponding to optical image information received by the photodiodes.

A typical signal processing circuit for use in this type of solid-state camera comprises a sensor which scans a light receiving section of the camera to derive optical image information stored in the light receiving section as electrical signals, and an amplifier which amplifies very small electrical signals produced from the sensor. A problem encountered with conventional signal processing circuits is that fixed pattern noise accompanied by the scanning and random noise inherent in the amplifier impair the quality of the electrical image signals.

An object of this invention is to provide a signal processing circuit for use in a solid-state camera which can suppress the aforementioned noises to a minimum for the production of electrical image signals of high quality.

Other objects and advantages of this invention will be fully understood from the following description taken in conjunction with the accompanying drawings, in which:

FIG. 1C is a sectional view showing the structure of a photoelectric conversion element and associated switching elements which constitute the solid-state camera of FIG. 1A;

FIGS. 2 and 3 are waveform diagrams useful for explaining fixed pattern noise;

FIG. 8 is a waveform diagram useful for explaining elimination of fixed pattern noise on the basis of an "integration system";

FIGS. 9A and 9B are diagrammatic respresentations useful for explaining a signal processing according to this invention; and FIGS. 10 to 15 illustrate embodiments of this invention.

Figure 1A:
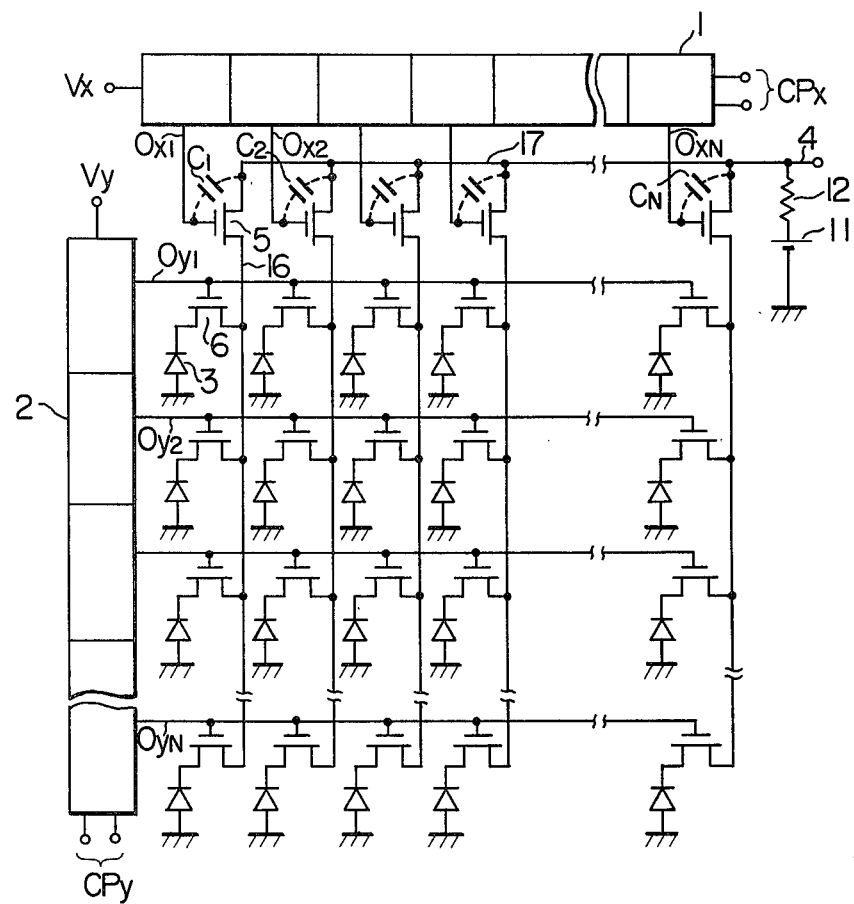
FIG. 1A is a schematic diagram of a sensor of a solid-state camera.

FIG. 1A shows an example of the sensor of the conventionally known construction of a solid-state camera for deriving image information therefrom. The sensor of the solid-state camera comprises a light receiving section having a plurality of unit cells arranged two-dimensionally, each of the unit cells including a photoelectric conversion element 3 in the form of a photodiode and a switching element 6 in the form of a MOS transistor. The sensor further comprises a vertical scanning circuit 2 for generating vertical scanning pulses to be applied to the gates of the MOS transistors 6 contained in the target, a plurality of horizontal scan switching elements 5 each of which takes the form of a MOS transistor having the source connected via a vertical signal line 16 to the drain of the MOS transistors 6 contained in the target, a horizontal scanning circuit 1 for generating horizontal scanning pulses to be applied to the gates of the MOS transistors 5, and a load resistor 12 connected to receive electrical signal from the drain of the respective MOS transistors 5.

Figure 1B:
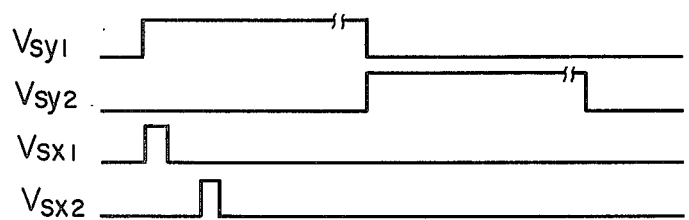
FIG. 1B is a waveform diagram showing scanning pulse signals used in the solid-state camera of FIG. 1A.

FIG. 1B shows scanning pulse signals similar to scanning pulses generated in a scanning system disclosed in Japanese Patent Application Laid-open No. 27313/'79 (Japanese Patent Application No. 91364/77) laid open to public on Mar. 1, 1979. It will be appreciated from FIG. 1B that there exists a time interval between one pulse in one horizontal scanning pulse signal and one pulse in the subsequent horizontal scanning pulse signal. Input pulses Vx and Vy respectively applied to the scanning circuits 1 and 2 shown in FIG. 1A are sequentially shifted predetermined time intervals by utilizing 2 to 4 phase clock pulses CPx and CPy to generate output vertical scanning pulse signals $V_{sy1}$, $V_{sy2}$, ... and output horizontal scanning pulse signals $V_{sx1}$, $V_{sx2}$, ... Illustrated in FIG. 1B are two of the vertical scanning pulse signals and two of the horizontal scanning pulse signals. These scanning pulse signals are applied, via output lines $O_{x1}$, $O_{x2}$, ... $O_{xN}$ of the scanning circuit 1 and output lines $O_{y1}$, $O_{y2}$, ... $O_{yN}$ of the scanning circuit 2, to the switching elements 5 and 6 to sequentially turn them on so that charge signals from the individual photoelectric conversion elements 3 are delivered to an output line 4 via a horizontal output line 17. Since the signal from the photoelectric conversion element corresponds to an optical image projected on the conversion element, the above operation ensures delivery of an electrical image signal.

In order to obtain a high resolution, this type of solid-state camera requires about 500×500 photoelectric conversion elements, and switching elements as well as separate horizontal and vertical scanning circuits. Therefore, it is general to manufacture the solid-state camera using MOS-LSI technique which can integrate the photoelectric conversion elements and switching elements at high density with relative ease. FIG. 1C shows, in sectional form, the structure of one of the photoelectric conversion elements which constitute the greater part of the in area of the solid-state camera IC, along with associated switching MOS transistors. In the drawing, reference numeral 13 designates a semiconductor substrate of one conductivity type, and 5 and 6 switching elements in the form of insulated gate type field effect transistors (simply referred to as MOS transistors hereinafter) which serve to select horizontal and vertical positions. The MOS transistors are constituted by diffusion layers 7, 10 and 15 of a conductivity type opposite to that of the substrate, these layers acting as drain or source, and gate electrodes 9 and 14 isolated from the diffusion layers by an insulating oxide film 8. The layer 10 acting as the source of the vertical switching MOS transistor 6 is used in part to constitute a photodiode. When taking a photodiode 10 associated with switching MOS transistors to the gates of which are simultaneously applied output pulses $V_{sxn}$ and $V_{syn}$ fed from the scanning circuits 1 and 2 in the form of shift registers comprised of MOS transistors via the output lines $O_{xn}$ and $O_{yn}$, this photodiode is charged from a video bias power supply 11 by an amount corresponding to a discharge in the photodiode which is in proportion to the intensity of incident light. At this time, the charging current generates an electrical image signal across the load resistor 12 which is delivered from an output terminal OUT.

Next, how to read charge signals in the sensor of the solid-state camera will be outlined.

The individual photodiodes 3 arranged two-dimensionally receive light, and photoelectrons are stored in its junction capacitor in accordance with the intensity of incident light. When the vertical scanning circuit 2 generates the scanning pulse signal $V_{sy1}$ on the vertical scanning output line $O_{y1}$, the vertical scan switching MOS transistors 6 arranged in row and connected with this output line are turned on. Subsequently, when the horizontal scanning circuit 1 generates the scanning pulse signals sequentially on the horizontal scanning output lines $O_{x1}, O_{x2}, \ldots$, the horizontal scan switching MOS transistors 5 are turned on sequentially so that the photoelectrons stored in the individual photodiodes 3 are derived onto the output line 4 sequentially, thereby producing an electrical image signal. At the termination of the reading of the photodiodes 3 associated with the horizontal scanning output line $O_{y1}$, the vertical scanning pulse signal $V_{sy2}$ is generated on the subsequent vertical scanning output line $O_{y2}$. Thus, under a similar horizontal scanning to the above, the photoelectrons stored in the photodiodes 3 associated with the vertical scanning output line $O_{y2}$ are read out. Sequential repetition of the vertical and horizontal scannings as set forth above complete the reading of all the photodiodes and the corresponding electrical image signals can be obtained.

FIG. 2 shows, in an enlarged form, waveforms of the horizontal scanning pulse signal $V_{sxn}$ applied to the gate of the n-th horizontal scan switching MOS transistor, the horizontal scanning pulse signal $V_{sx(n+1)}$ applied to the gate of the (n+1)th horizontal scan switching MOS transistor, and the image signal $S_{vo}$ produced on the output terminal OUT (FIG. 1C). Spike voltage fluctuations $z_n$, $z'_n$, $z_{n+1}$ and $z'_{n+1}$ on the image signal $S_{vo}$ are called spike noise and caused at the initiation and termination of the horizontal scanning pulse under the influence of parasitic capacitances $C_n$ or $C_{n+1}$ established between the gate of the MOS transistor or the horizontal scanning output line $O_{xn}$ or $O_{x(n+1)}$ and the horizontal signal line 17 as shown in FIG. 1. Dotted curves $S_n$ and $S_{n+1}$ represent charge signals.

If the spike noise has a fixed configuration irrespective of the scanning points, the waveform of this spike noise exclusively contains a frequency component repesentative of the repetition rate of pulses on the image signal $S_{vo}$ and frequency components which are integer times the repetition rate, thus excluding lower frequency components than those contained in the normal signal. Under this condition, the spike noise can readily be eliminated by a low-pass filter, without affecting the image signal adversely. Actually, however, configuration and magnitude of the spike noise varies greatly with variation of the horizontal scanning pulse signal $V_{sx}$ and the parasitic capacitance $C_n$, resulting in a waveform similar to an amplitude-modulated waveform as shown in FIG. 3. Additionally, in contrast to the normal amplitude modulation wave, the carrier frequency (corresponding to the spike repetition rate) is close to modulation frequency (at which the spike waveform varies) with a result that an envelope $E_1$ for positive spikes and an envelope $E_2$ for negative spikes are out of phase with respect to each other. For this reason, the spike noise contains a lower frequency component as designated at dotted curve $E_o$ than the repetition rate of the spikes. This lower frequency component lies in the same bandwidth as the normal electrical image signal and can pass through the low-pass filter, giving rise to the creation of a false signal interferring with the image signal. Especially, the false signals tend to occur in the signals from the photodiodes 3 in the column owning any one of the vertical signal lines 16 in common and they are added to each other. As a result, these false signals are reproduced on the screen to display noticeable vertical stripes of fixed pattern noise leading to great impairment of the picture quality.

Figure 4:
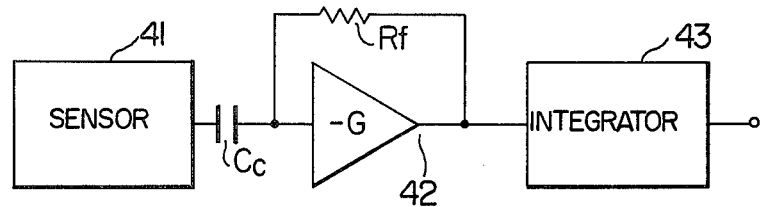
FIG. 4 is a block diagram of a conventional signal processing circuit.

In order to eliminate the fixed pattern noise as described above, an "integration system" as shown in FIG. 4 has been proposed. This system, reported in "IEEE ISSCC 72/Wednesday, Feb. 16, 1972" pp. 30–31, for example, eliminates the noise by integrating the image signal containing fixed pattern noise. FIG. 4 generally shows a signal processing circuit for the image signal produced from the light receiving section of the solid-state sensor. The signal processing circuit comprises sensing means in a sensor 41 for deriving an electrical signal corresponding to an optical image signal stored in the light receiving section, a preamplifier 42 connected to receive the output of the sensing means via a coupling capacitor $C_c$ for amplification of the same, and an integrator 43 for integrating the output of the preamplifier. The preamplifier 42 is a voltage feedback type amplifier with a feedback impedance $R_f$. In the case of a monochromatic solid-state camera, the output of the integrator 43 is passed through a low-pass filter and a main amplifier and thereafter subjected to the processings of clamping, blanking, addition of synchronizing signal and $\gamma$ correction. In the case of a color camera, the output of the integrator 43 is subjected to an additional processing by being passed through a color encoder for the generation of an NTSC signal. The above signal processings in the subsequent stages do not constitute the subject of this invention.

Figure 5A:
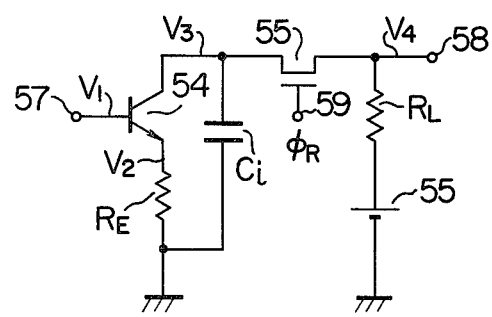
FIG. 5A is a circuit diagram of an integrator used in the circuit of FIG. 4.
Figure 5B:
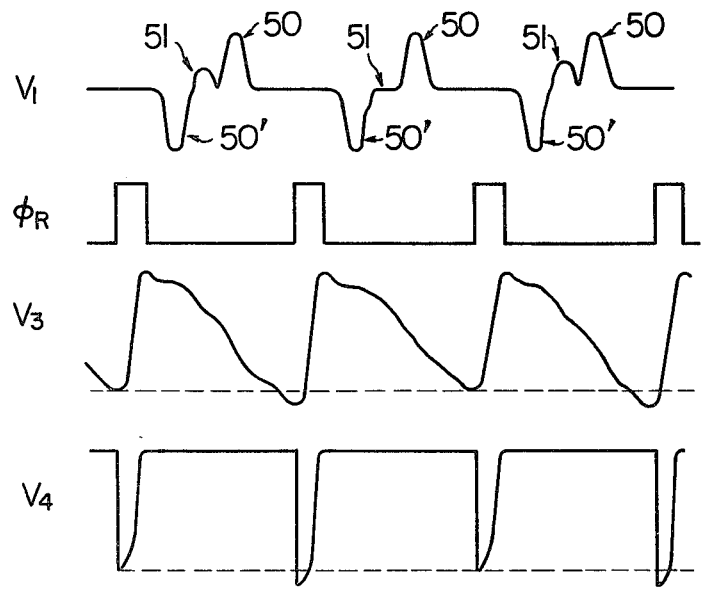
FIG. 5B is a waveform diagram useful for explaining the operation of the circuit shown in FIG. 5A.

FIG. 5A shows details of the integrator 43, which performs a similar function to that of an integrator described in the aforementioned publication. FIG. 5B shows a timing chart for explaining the operation of the circuit shown in FIG. 5A. Referring to FIG. 5A, the exemplified integrator comprises a MOS transistor switch 55, a signal input terminal 57 connected to the output terminal of the preamplifier, a signal output terminal 58, and a terminal 59 to which a reset pulse $\phi_R$ is applied. A transistor 54 and a resistor $R_E$ constitute an emitter follower citcuit. Established between emitter potential $V_2$ and base potential $V_1$ is:

$$V_2 = V_1 - V_{BE} \tag{1}$$

where $V_{BE}$ represents base-emitter voltage.

Current i flowing through the resistor $R_E$ is expressed as, $$i = \frac{V_2}{R_E} = \frac{V_1 - V_{BE}}{R_E} \tag{2}$$

Discharging a capacitor $C_i$ with this current results in an integration of the image signal. Assuming that the time interval during which the MOS transistor switch 55 is rendered off by the reset pulse $\phi_R$ is $t_1$, collector voltage $V_3$ immediately before the MOS transistor switch 55 is turned on is:

$$V_3 = \frac{1}{C_i R_E} \int_0^{t_1} (V_1 - V_{BE}) dt, \tag{3}$$

thus indicating that the input voltage $V_1$ or image signal is integrated (see waveforms $V_1$ and $V_3$ in FIG. 5B).

To the base of the transistor 54 is applied an electrical image signal as shown at $V_1$ in FIG. 5B. The waveform is representative of the image signal which contains the charge signal as shown at dotted curve in the waveform $S_{vo}$ in FIG. 2 and the fixed pattern noise as shown in FIG. 3. In the strict sense, as described with reference to FIG. 3, the spike noise contains a series of paired positive spike and negative spike subsequent thereto wherein each pair has a different magnitude and configuration. However, for simplicity of explanation, the spike noise illustrated in the waveform $V_1$ has uniform paired positive and negative spikes. The signal waveform $V_1$ is produced from the output of the preamplifier 42 and corresponds to inversion of the waveforms shown in FIGS. 2 and 3. To the gate of the transistor 55 is applied a reset pulse as shown at $\phi_R$ in FIG. 5B.

When the transistor 55 is turned on under the application of the reset pulse signal $\phi_R$, the capacitor $C_i$ is charged by a power supply 56 via a resistor $R_L$. During this charging, a voltage related to $V_3$ in equation (3) is produced as an output voltage $V_4$ (see FIG. 5B). A time constant for this charging is determined by a product of a sum of the resistor $R_L$ resistance and the resistance of the MOS transistor switch 55 in a conductive state and the capacitor $C_i$ capacitance. This time constant is determined such as to be sufficiently small as compared with the ON-time period of the switch 55. If restrictions on the gain require an increased time constant so that the capacitor $C_i$ cannot be charged sufficiently during the ON-time period of the switch 55, correction for frequency characteristics should be effected in the subsequent stage.

Accordingly, when the image signal $V_1$ shown in FIG. 5B and containing symmetric positive and negative spikes 50 and 50' is applied, the waveform $V_3$ obtained as a result of integration according to equation (3) is unaffected by these spikes. Consequently, the output voltage $V_4$ from the integrator is free from the spikes. In other words, even when the gate-drain capacitance and the gate-source capacitance of the horizontal MOS transistor switch 5 are irregular variance and hence the configuration of spikes 50 and 50' is different between picture elements, the collector potential $V_3$ in equation (3) depends only on an image signal 51.

Figure 6:
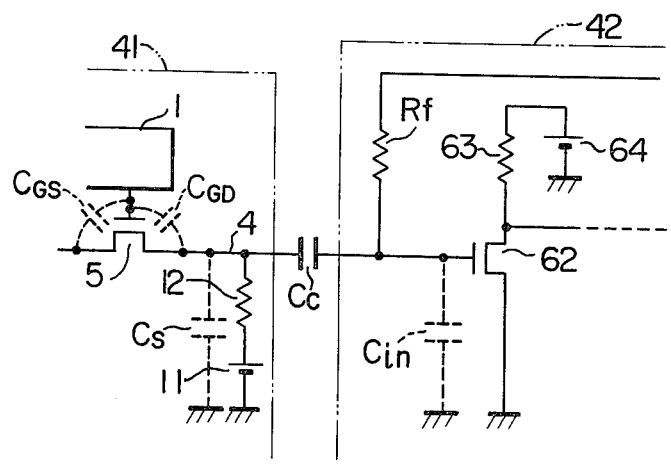
FIG. 6 is a circuit diagram of a sensor and the input stage of a preamplifier.

The output stage of the sensing means in the sensor 41 and the input stage of preamplifier 62 are specified in FIG. 6. In the figure, capacitors $C_{GS}$, $C_{GD}$, $C_s$ and $C_{in}$ are not what are intentionally provided but are parasitic ones. Since the output signal from the sensing means in the sensor 41 is extremely small, it is necessary to carefully design the preamplifier 42 in view of random noise. A transistor 62 in the first stage of the preamplifier is a junction type FET having a small equivalent input noise resistance. A feedback resistor $R_f$ and a video bias resistor 12 have a large resistance of 100 KΩ to 1 MΩ, typically, about 300 KΩ.

On the other hand, in order to improve the horizontal resolution, it is necessary to complete the reading of the output signal from the sensor within one picture element time duration, minimizing residue of reading which may merge into the subsequent picture element reading. To this end, the preamplifier 42 is required to have an input impedance $Z_{in}$ as small as possible. If the residual reading is not small to degrade the horizontal resolution, the frequency characteristic must be corrected in the subsequent stage at the cost of signal to random noise ratio. The input impedance $Z_{in}$ of the preamplifier can be decreased by using a preamplifier of a voltage feedback type as shown in FIG. 6 and by increasing the gain G of the preamplifier. For a large gain G, $$Z_{in} \simeq R_f/G \tag{4}$$

is obtained. As described above, to minimize random noise and residual reading of signal, it is necessary that the voltage feedback type preamplifier be used.

Now, problems are raised by random noise inherent in the preamplifier, especially in the first stage FET 62 in the circuit of FIG. 6. The FET typically has an equivalent noise resistance of about 50 to 100Ω.

Figure 7A:
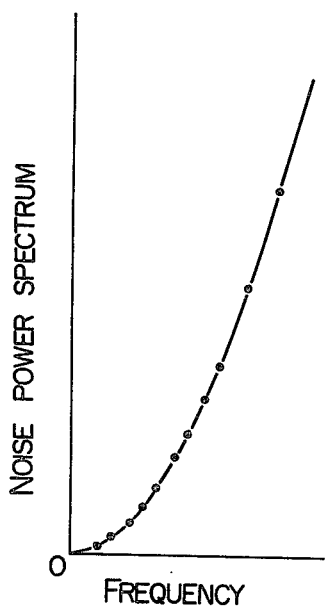
FIGS. 7A to 7C are graphic representations useful for explaining random noise.

A random noise $n_1$ caused internally of the preamplifier is assumed to have a noise power $N_1$ at the output terminal of the amplifier. For simplicity of explanation, the noise power $N_1$ will be considered on a frequency base axis so that the noise power represents a noise power spectra. The voltage feedback by noise $n_1$ is substantially proportional to a division ratio between a parallel resultant impedance of the sensor output line parasitic capacitance $C_S$ and the first stage FET gate capacitance $C_{in}$ connected in parallel and the impedance of the feedback resistor $R_f$. More particularly, the voltage feedback by the noise $n_1$ is decreased substantially in proportion to the frequency. Accordingly, the noise power $N_1$ is related to frequency f such that:

$$N_1 \propto f^2 \tag{5},$$

exhibiting the so-called "triangular noise" as illustrated in FIG. 7A.

As an ideal model of the integrator 43, an integrator is assumed which integrates an input image signal for one picture element time duration $1/f_s$, and effects instantaneous delivery of the integration output and concurrent resetting to the initial value. From a calculation based on the Fourier transform, it will be seen that the above ideal integrator is equivalent to a system in which the input signal is passed through a filter having a power transfer characteristic P(f) expressed as, $$P(f) \propto \frac{\sin^2\left(\frac{f}{f_s} \times \pi\right)}{f^2} \tag{6}$$

and is then sampled at frequency $f_s$.

Figure 7C:
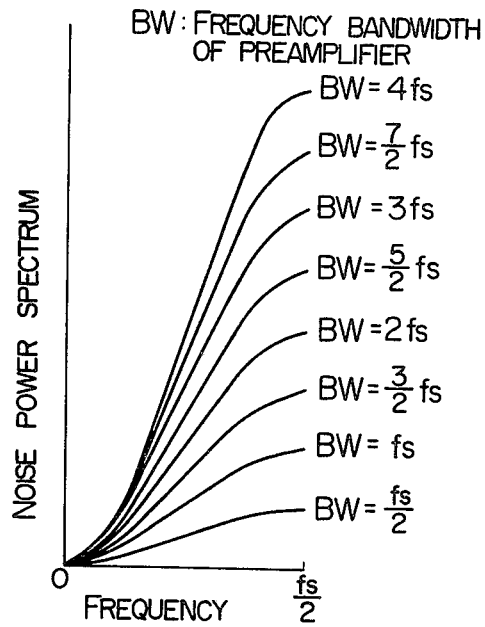
Figure 7B:
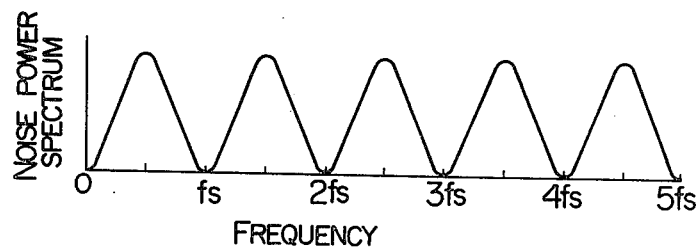

When the noise power $N_2$ is passed through the filter of power transfer characteristic P(f), an output noise power $N_2$ therefrom is expressed as, $$N_2 \propto \sin^2\left(\frac{f}{f_s} \times \pi\right) \tag{7}$$

by combining equations (5) and (6). This output noise power $N_2$ is illustrated in FIG. 7B.

Subsequently, by sampling the output noise at the frequency $f_s$, noise in a high frequency region folds on a low frequency region. This folding effect is well known in the art, and is referred to as aliasing. Such a folding is shown in FIG. 7C. If the frequency bandwidth BW of the preamplifier is infinite, the "triangular noise" as applied to the above ideal integrator is delivered therefrom as a noise of infinite power.

Actually, however, the existing preamplifier cannot have the infinite frequency bandwidth and the delivery of the infinite power noise from the integrator does not occur. In addition, the actual integrator 43 is not the ideal integrator and it requires a finite time for each of the actions of reading and resetting to the integral initial value. Consequently, the relation between the preamplifier frequency bandwidth BW and the random noise power delivered out of the integrator is not so severely critical as shown in FIG. 7C. However, due to the fact that the magnitude of the random noise delivered out of the integrator is positively correlated to the preamplifier frequency bandwidth, the random noise is increased in the "integration system" employed to suppress the fixed pattern noise of the solid-state sensor, raising a significant problem.

Causes for this problem, that is, for the generation of the "triangular noise" and of the "folding" or "aliasing" of noise on the frequency base axis by the integrator are such that each of them can be calculated and anticipated by the conventional technique with relative ease. However, the adverse increase in random noise resulting from the "integration system" employed to eliminate the fixed pattern noise has been determined by the inventors of this invention for the first time.

In order to reduce the random noise in the signal processing circuit based on the "integration system" employed to eliminate the fixed pattern noise, the frequency bandwidth of the preamplifier 42 is required to be narrowed as will easily be seen from FIG. 7C. That is to say, it is necessary to insert a low-pass filter between the preamplifier 42 and the integrator 43, or to intentionally provide the preamplifier 42 with low-pass frequency characteristics.

With this construction, however, there arises a problem that the noise induced in the gate of the horizontal MOS transistor switch 5 which comes into the horizontal signal line 17 or the output line 4 via the parasitic capacitances $C_{GS}$ and $C_{GD}$ and which results in the fixed pattern noise 50 and 50' may be cancelled out by integration only to a lesser extent. The effect of cancellation of the fixed pattern noise has already been described with reference to the FIG. 5A circuit and FIG. 5B waveforms, but will be detailed herein with reference to FIG. 8.

Waveforms as shown in FIG. 8 are useful to explain the cancellation of noise 50 and 50' coming into the signal line. In the drawing, hatched portions are representative of the image signal, one picture element time duration ranges from time point $t_2$ to time point $t_3$, and $t_4$ represents a time point at which an integration result is read out and an initial value is restored by resetting.

The horizontal scanning pulse voltages as shown at (b) and (b') in FIG. 8 are applied to the gate of the horizontal MOS transistor switch 5 and superimposed on the image signal as shown at (a) in FIG. 8 by way of the gate-drain capacitance $C_{GD}$ and gate-source capacitance $C_{GS}$, so that the output signal as shown at (c) in FIG. 8 is produced from the preamplifier. The noise 50 and 50' take the form of differentiated waves since the input impedance $Z_{in}$ of the preamplifier as formulated in equation (4) is a pure resistance. In other words, the differentiation time constant which approximately equals a product of a sum of the sensor image signal output line parasitic capacitance $C_S$ and the preamplifier input capacitance $C_{in}$ and the preamplifier input resistance $R_f/G$ in the right side term of equation (4) is, usually, sufficiently small as compared with the one picture element time duration (usually, about 1/7 MHz).

The image signal 51 on which the noise 50 and 50' are superimposed as shown at (c) in FIG. 8 is integrated over each one picture element time duration to produce a waveform as shown at (d) in FIG. 8 in which the pulse applied on the gate of the horizontal MOS transistor switch 5 is approximately reproduced and an integration waveform of the image signal 51 is superimposed thereon. Accordingly, even when the horizontal MOS transistor switches 5 arranged in different rows have different gate-drain capacitances $C_{GD}$ and different gate-source capacitances $C_{GS}$ so that the magnitude and configuration of noise 50 and 50' are different between the picture elements, only the heights of the rectangular waves in the integrated waveform as shown at (d) in FIG. 8 approximately reproducing the pulse on the gate of the horizontal MOS transistor switch 5 differs for the the picture elements, and it is possible to read out only the image signal unaffected by the noise 50 and 50' by reading out the integration result at time point $t_4$ which is subsequent to the termination of the rectangular wave.

As a matter of significance, the setting of time point $t_4$ has a tolerance. Therefore, it can be thought of that even if a low-pass filter preceding the integrator is provided for blunting the noise spikes 50 and 50' to some extent, the noise cancellation effect by the integration can be maintained.

FIG. 9A shows, in simplified form, changes of the noise 50 and 50' which take place when a rectangular wave acting as a noise source is passed through a system having a series of a differentiator, a low-pass filter and an integrator. Namely, FIG. 9A illustrates waveforms of a signal appearing at some points between the gate of the horizontal MOS transistor switch 5 and the integrator. For simplicity, the differatiation time constant which determines the waveform of the noise 50 and 50' is neglected and effects of the differentiation and integration are canceled out, so that changes of the noise can be simplified as shown in FIG. 9B. Irregularities in the magnitude of noise due to irregularities in the capacitances $C_{GD}$ and $C_{GS}$ of the horizontal MOS transistor switches 5 are represented by irregularities in height X of a rectangular wave 80. When the voltage is normalized by the height X, an integration wave 81, after passed through the low-pass filter, has an "integral residue" x. Since the integral residue indicates affect of the noise on the image signal read out at time point related to reading of the integral result, this integral residue will be discussed below.

Assuming that the ON-time of the horizontal MOS transistor switch 5 is T, the time interval ranging from a cut-off of the horizontal MOS transistor switch 5 to the reading of the integral result is t, and the low-pass filter is a linear filter having a cut-off frequency $f_0$ (at which attenuation is 3 dB), the "integral residue" x is readily calculated and expressed as, $$x = \exp(-2\pi f_0 t) - \exp\{-2\pi f_0(t+T)\} \qquad (8).$$

When:
  $T = 1/(3f_s)$
  $t = 1/(2f_s)$
  $f_0 = f_s$ is exemplified in relation to the horizontal clock frequency $f_s$, equation (8) is calculated to obtain $x \simeq 0.04$.

Next, negligibility of this "integral residue" in the order of several percents will be discussed. Actually, the completely linear amplification is difficult to achieve even with a high frequency bandwidth preamplifier on account of restrictions on power consumption and hence the positive and negative noise 50 and 50' are unbalanced by the order of several percents. In addition, the positive and negative noise 50 and 50' are originally unbalanced since symmetical initiation and termination of the pulse on the gate of horizontal MOS transistor switch 5 is difficult to obtain during occurrence of the noise and the capacitances $C_{GD}$ and $C_{GS}$ vary with the initiation and termination of the gate pulse. For these reasons, it is concluded that the "integral residue" in the order of several percents is negligible.

On the other hand, as will be seen from FIG. 7C, the provision of the low-pass filter preceding the integrator reduces the random noise drastically.

In the foregoing embodiment, the low-pass filter is exemplified as the linear filter which is a most simplified filter free from ringing and is easy to design and calculate. However, the low-pass filter is not limited to the linear type but may be of other types.

Reference is now made to FIG. 10 which shows a signal processing circuit embodying the present invention. The signal processing circuit comprises sensing means in a solid-state sensor 41 for picking up a very small electrical signal corresponding to optical image information from the light receiving section (FIG. 1A) of the solid-state sensor, a preamplifier 90 for amplifying the small output of the sensor 41, and an integrator 43 which integrates the output of the preamplifier 90 for eliminating fixed pattern noise contained in this output. The preamplifier 90 including an amplifier circuit 91 and a feedback path 92 which has low-pass filter characteristics. The sensor is coupled to the preamplifier via a coupling capacitor $C_c$. The frequency characteristic of the gain G(f) of the amplifier circuit 91 in the preamplifier 90 is predominant with respect to the noise 50 and 50' in the form of some voltage source coming into the preamplifier 90 whereas the image signal 51 and random noise caused internally of the amplifier circuit 91 are subjected to the frequency characteristic of the impedance Z(f) of the feedback path 92 as well as to the frequency characteristics of the gain G(f) of the amplifier circuit 91. Thus, the design of the frequency characteristics of the feedback impedance Z(f) are critical and it is necessary that the frequency characteristics of the gain G(f) of the amplifier circuit 91 match those of the feedback impedance Z(f). For example, the design consideration may be:

$$G(f)/G(o) = Z(f)/Z(o) \quad (9)$$

by which the image signal 51, noise 50 and 50' and random noise caused in the first stage of amplifier circuit 91 are subjected to the same frequency characteristics, thus simplifying the design, where G(o) represents DC gain of the amplifier circuit 91 and Z(o) represents DC impedance of the feedback path 92.

Figure 12:
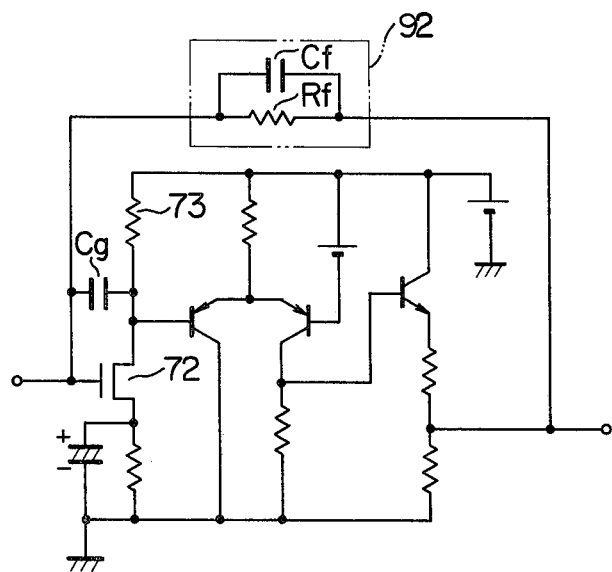

The preamplifier 90 of FIG. 10 is specified as shown in FIG. 12. The low-pass characteristics of the gain G(f) of the amplifier circuit 91 is implemented by connecting, between the drain and gate of the first stage FET 72, a capacitor $C_g$ which cooperates with a resistor 73 to form a time constant circuit (low-pass filter) whereas the frequency characteristics of feedback impedance 92 is implemented by connecting a feedback resistor $R_f$ in parallel with a capacitor $C_f$. Typically, the feedback resistor has a large resistance of 100 KΩ to 1 MΩ but a parasitic capacitance (1 to 0.5 pF) can stand for the capacitor $C_f$. The provision of the low-pass characteristic to the first stage of the amplifier circuit 91 as described above facilitates design of the dynamic range of the preamplifier 90 and assures an additional advantage that symmetrical transmission of the positive and negative noise 50 and 50' can be ensured.

Figure 11:
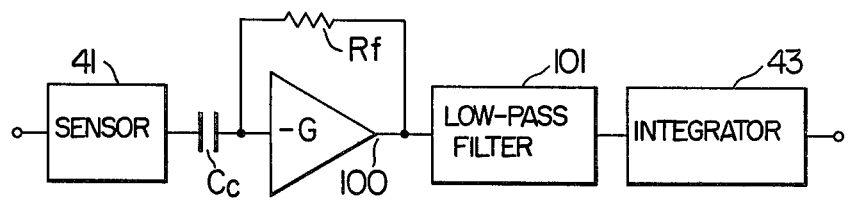

FIG. 11 shows another embodiment of the present invention. A signal processing circuit as shown in FIG. 11 comprises sensing means in a sensor 41 and an intergrator 43 similar to those shown in FIG. 10, a preamplifier 100 of a feedback type amplifier for amplifying a small output of the sensor 41, and a low-pass filter 101 connected between the preamplifier 100 and the integrator 43. A coupling capacitor $C_c$ is inserted between the sensor 41 and the preamplifier 100. A voltage feedback type amplifier similar to the preamplifier 42, for example, as shown in FIG. 4 may be used as the preamplifier 100.

Figure 13:
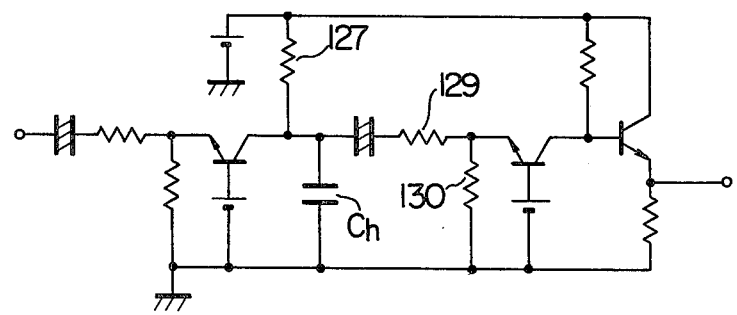

Details of the FIG. 11 arrangement are shown in FIG. 13. Capacitor $C_h$ and resistors 127, 129 and 130 mainly participate in establishing low-pass filter characteristics.

FIG. 14 shows another example of the preamplifier 90 of FIG. 10 wherein the amplifier circuit 91 includes two amplifier stages $A_1$ and $A_2$, and a low-pass filter circuit of a resistor $R'$ and a capacitor $C_g'$ inserted between the two amplifier stages. The feedback impedance 92 includes a parallel circuit of a capacitor $C_f'$ and a resistor $R_f'$ connected between the input terminal of amplifier stage $A_1$ and the output terminal of amplifier stage $A_2$.

FIG. 15 shows another example of the filter 101 of FIG. 11 which includes an operational amplifier OP and a capacitor $C_h'$ connected between input and output terminals of the operational amplifier.

We claim:

1. A signal processing circuit for use in a solid-state camera having a light receiving section for converting an optical image to an electrical signal, the circuit comprising:
   means for sensing the electrical signal output of said light receiving section;
   means for amplifying the output of said sensing means, said amplifying means including an amplifying section and a circuit section for narrowing the bandwidth of said amplifying means; and
   means for integrating and sampling the output of said amplifying means,
   wherein the parameters of circuit elements of said circuit section for narrowing the bandwidth of said amplifying means are set to suppress aliasing of noise inherent in said amplifying means due to said integrating and sampling means.

2. A circuit according to claim 1, in which said amplifying section includes an amplifier and a voltage feedback path thereacross.

3. A circuit according to claim 2, in which said circuit section of said amplifying means includes a low-pass filter connected between said amplifier and said integrating means.

4. A circuit according to claim 3, in which said low-pass filter has a cutoff frequency substantially identical with the frequency at which picture elements of the image on said light receiving section are read out.

5. A circuit according to claim 2, in which said circuit section of said amplifying means includes a first capacitance connected in parallel with said voltage feedback path and a second capacitance arranged to form, in said amplifier, a time-constant circuit portion having low-pass filter frequency characteristics.

6. A circuit according to claim 5, in which the frequency characteristics of the parallel connection of said first capacitance and said feedback path are substantially identical with those of said amplifier.

7. A signal processing circuit for a solid-state camera having a light receiving section for converting an optical image to an electrical signal, the circuit comprising:
a sensor for deriving the electrical signal from said light receiving section by the use of horizontal and vertical scanning signals;
a voltage feedback type preamplifier having a feedback path thereacross and a circuit arrangement for narrowing the bandwidth of said preamplifier, said preamplifier being connected with said sensor for amplifying the output of said sensor; and
an integrator connected with said preamplifier for integrating and sampling the output of said preamplifier for each picture element of said electrical signal,
wherein the parameters of circuit elements of said circuit section for narrowing the bandwidth of said preamplifier are set to suppress aliasing of noise inherent in said preamplifier due to said integrator.

8. A circuit according to claim 7, in which said circuit arrangement is a low-pass filter connected between said preamplifier and said integrator.

9. A circuit according to claim 8, in which said low-pass filter has a cutoff frequency substantially identical with the repetition frequency of said horizontal scanning signal.

10. A circuit according to claim 7, in which said circuit arrangement includes a first capacitance connected in parallel with said feedback path and a second capacitor forming in said amplifier a low-pass filter circuit portion.

11. A circuit according to claim 10, in which the frequency characteristics of the parallel connection of said feedback path and said first capacitance are substantially identical with those of said preamplifier.

12. A signal processing circuit for use in a solid-state camera having a light receiving section for converting an optical image to an electrical signal, the circuit comprising:
means for sensing the electrical signal output of said light receiving section;
means for amplifying the output of said sensing means, said amplifying means including an amplifying section and a circuit section for narrowing the bandwidth of said amplifying means; and
means for integrating the output of said amplifying means,
wherein said amplifying section includes an amplifier and a voltage feedback path thereacross, and wherein said circuit section of said amplifying means includes a low-pass filter connected between said amplifier and said integrating means, said low-pass filter having a cutoff frequency substantially identical with the frequency at which picture elements of the image on said light receiving section are read out.

13. A signal processing circuit for use in a solid-state camera having a light receiving section for converting an optical image to an electrical signal, the circuit comprising:
means for sensing the electrical signal output of said light receiving section;
means for amplifying the output of said sensing means, said amplifying means including an amplifying section and a circuit section for narrowing the bandwidth of said amplifying means; and
means for integrating the output of said amplifying means,
wherein said amplifying section includes an amplifier and a voltage feedback path thereacross, and further wherein said circuit section of said amplifying means includes a first capacitance connected in parallel with said voltage feedback path and a second capacitance arranged to form, in said amplifier, a time-constant circuit portion having low-pass filter frequency characteristics, with the frequency characteristics of the parallel connection of said first capacitance and said feedback path being substantially identical with those of said amplifier.

14. A signal processing circuit for a solid-state camera having a light receiving section for converting an optical image to an electrical signal, the circuit comprising:
a sensor for deriving the electrical signal from said light receiving section by the use of horizontal and vertical scanning signals;
a voltage feedback type preamplifier having a feedback path thereacross and a circuit arrangement for narrowing the bandwidth of said preamplifier, said preamplifier being connected with said sensor for amplifying the output of said sensor; and
an integrator connected with said preamplifier for integrating the output of said preamplifier;
wherein said circuit arrangement is a low-pass filter connected between said preamplifier and said integrator, in which said low-pass filter has a cutoff frequency substantially identical with the repetition frequency of said horizontal scanning signal.

15. A signal processing circuit for a solid-state camera having a light receiving section for converting an optical image to an electrical signal, the circuit comprising:
a sensor for deriving the electrical signal from said light receiving section by the use of horizontal and vertical scanning signals;
a voltage feedback type preamplifier having a feedback path thereacross and a circuit arrangement for narrowing the bandwidth of said preamplifier, said preamplifier being connected with said sensor for amplifying the output of said sensor; and
an integrator connected with said preamplifier for integrating the output of said preamplifier,
wherein said circuit arrangement includes a first capacitance connected in parallel with said feedback path and a second capacitor forming in said amplifier a low-pass filter circuit portion, with the frequency characteristics of the parallel connection of said feedback path and said first capacitance being substantially identical with those of said preamplifier.

* * * * *